(12) United States Patent
Michel, Jr.

(10) Patent No.: US 6,341,704 B1
(45) Date of Patent: Jan. 29, 2002

(54) ADJUSTABLE RACK FOR LAUNDRY TUB OR THE LIKE

(76) Inventor: Charles J. Michel, Jr., 1731 Summit Ave., St. Paul, MN (US) 55105

( * ) Notice: Subject to any disclaimer, the term of this patent is extended or adjusted under 35 U.S.C. 154(b) by 0 days.

(21) Appl. No.: 09/707,822

(22) Filed: Nov. 8, 2000

(51) Int. Cl.[7] .................................................. A47F 5/00
(52) U.S. Cl. .............. 211/181.1; 211/119; 211/119.011; 211/175; D6/458; D6/566
(58) Field of Search .............................. 211/181.1, 119, 211/90.02, 90.03, 175, 119.011, 41.4; D6/458, 566

(56) References Cited

U.S. PATENT DOCUMENTS

| | | | | |
|---|---|---|---|---|
| 573,835 A | * | 12/1896 | Taylor | |
| 1,006,328 A | * | 10/1911 | Widenhofer | |
| 2,006,169 A | * | 6/1935 | Harris-Jones | |
| 2,639,816 A | * | 5/1953 | Fogg | |
| 3,063,360 A | * | 11/1962 | Fitch et al. | |
| 4,053,954 A | * | 10/1977 | Chapman | |
| D358,458 S | * | 5/1995 | Brightbill et al. | |
| 5,584,405 A | * | 12/1996 | Tunzi | 211/175 X |
| D417,809 S | * | 12/1999 | Hofman | D6/525 |
| 6,109,462 A | * | 8/2000 | Emalfarb et al. | 211/119 |
| 6,119,588 A | * | 9/2000 | Tiemann | 211/181.1 X |
| 6,164,194 A | * | 12/2000 | Westmoreland | 211/181.1 X |
| D441,996 S | * | 5/2001 | Wright | D6/525 |

* cited by examiner

Primary Examiner—Robert W. Gibson, Jr.
(74) Attorney, Agent, or Firm—Jacobson and Johnson

(57) ABSTRACT

A stiff wire rack for hanging in a laundry tub or sink is adjustable to accommodate tubs or sinks of various sizes.

5 Claims, 3 Drawing Sheets

ADJUSTABLE RACK FOR LAUNDRY TUB OR THE LIKE

FIELD OF THE INVENTION

This invention is aimed at providing a stiff wire rack, sometimes referred to as a laundry tub caddy, for household use which is located in and hangs onto the sides of a tub such as a laundry tub or a sink and is adjustable in width to accommodate different size sinks or tubs.

BACKGROUND OF THE INVENTION

Stiff wire racks are used in industry and in the home for a variety of purposes. Typically, in the home the rack may be used in a kitchen sink for holding dishes to dry after they have been washed. Other uses in the home may be in a laundry tub for holding cleaning supplies used for doing the laundry or for holding articles to dry after they have been washed. Typically, as an example, a wire rack in the laundry tub might be used for holding paint brushes for drying after they have been washed and/or the paint can and cleaning materials.

In the above-described uses and in other cases for domestic or household use, the wire racks which are commercially available for sitting into a tub or sink are of single size so are not adaptable for use in different size tubs or sinks. Therefore, the homeowner may need a number of different wire racks for use in a sink or a laundry tub when the tubs are of different dimensions. Also, this means that the vendors of the stiff wire racks have to carry a number of different size units to accommodate purchasers for the different size tubs and sinks that are in the purchasers' homes.

SUMMARY OF THE INVENTION

A stiff wire rack is made of two identical support members, one generally overlaying the other. Clips hold corresponding wires of each of the support members together while permitting them to be slidably moved with respect to one another. In this fashion the wire rack can be adjusted in size to accommodate different sized laundry tubs or sinks. At one end of each of the two sections are upstanding hanger members which are hingedly or pivotally attached at one end to the support members and are hooked at their other ends to engage the upper edge of the tub or sink to hold the rack in place within the confines of the tub.

DESCRIPTION OF THE PREFERRED EMBODIMENTS

Figure 1:
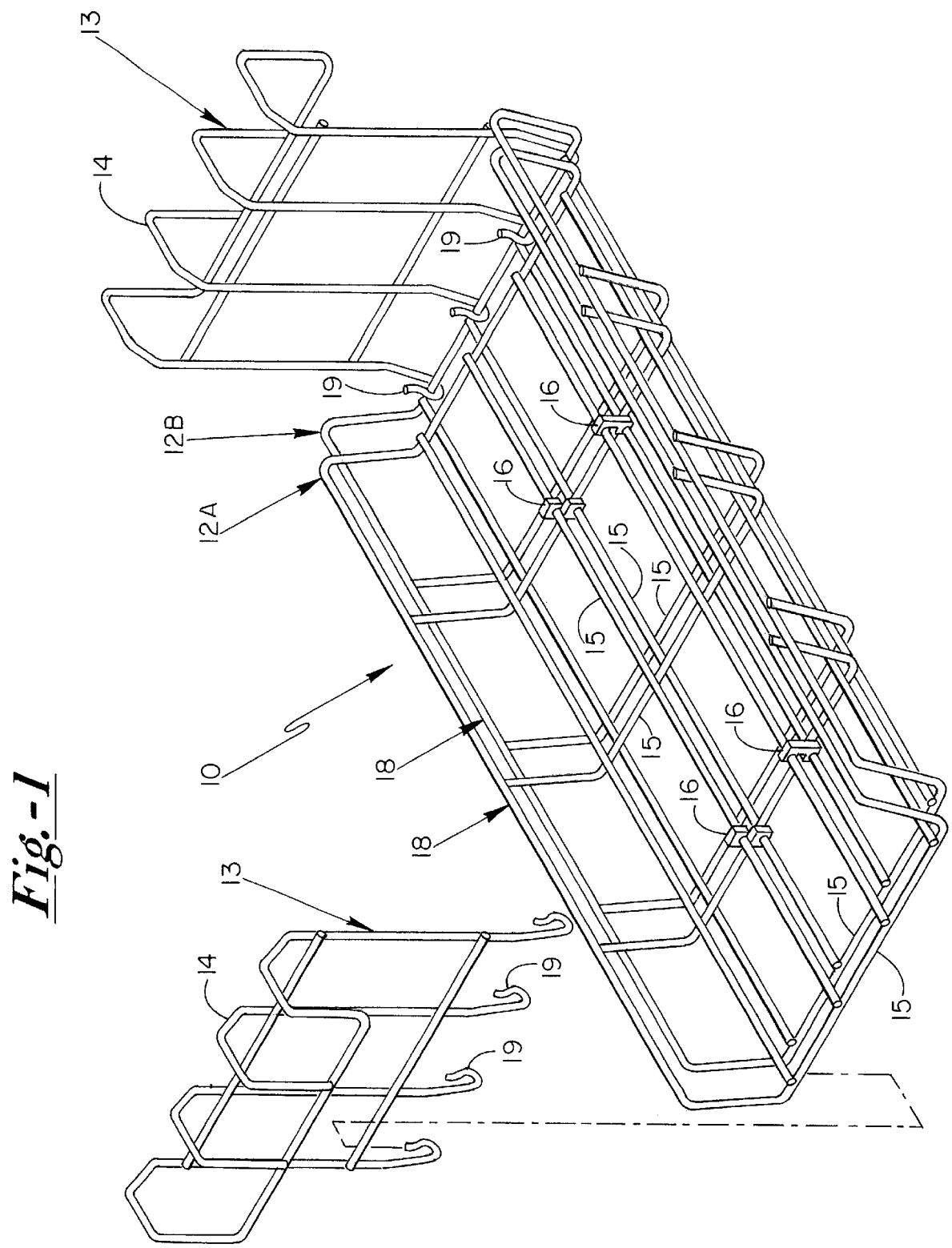
FIG. 1 is a partial break-away perspective view of an embodiment of the invention.
Figure 2:
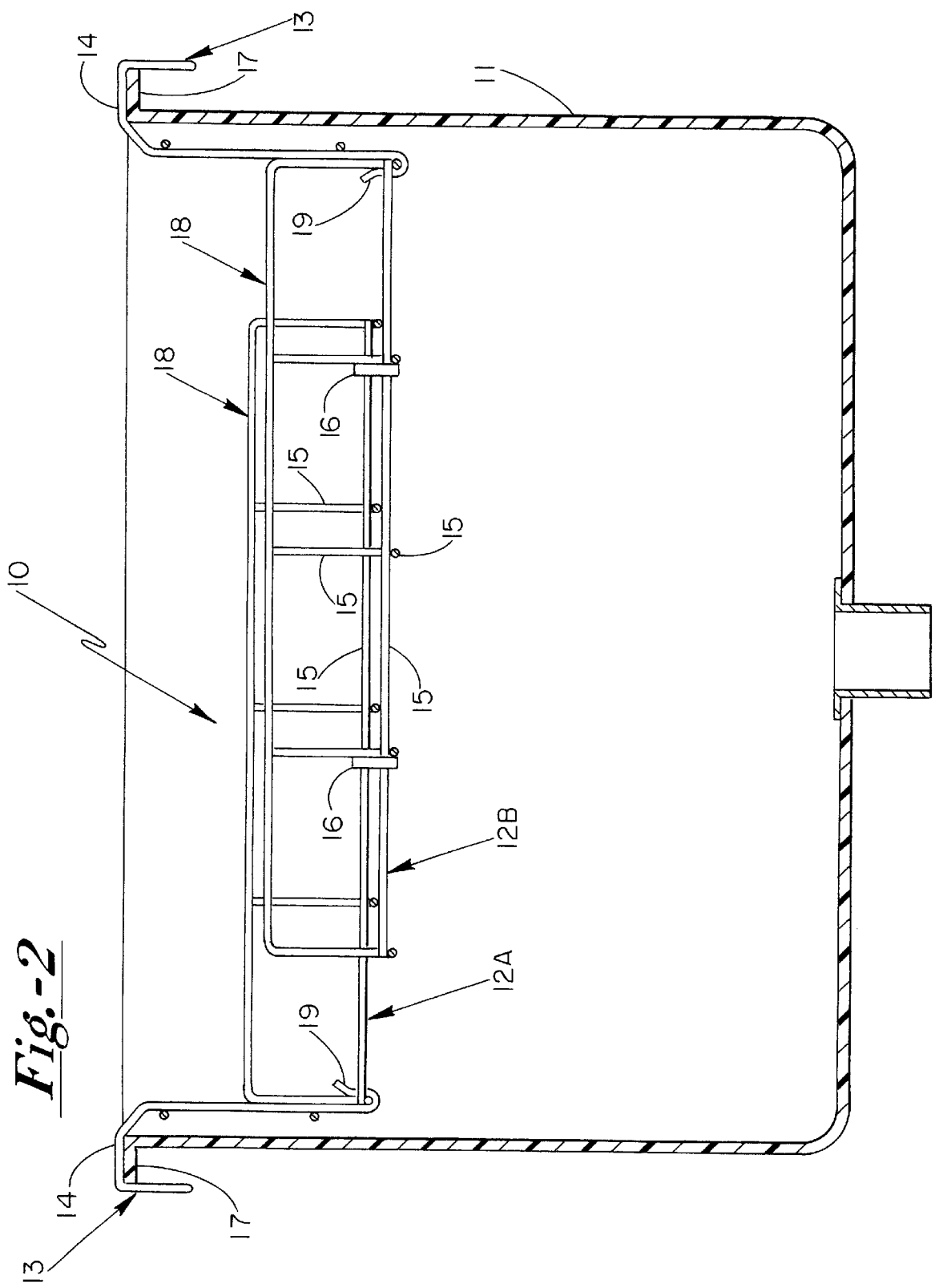
FIG. 2 is a view illustrating the invention in place in a tub or sink.
Figure 3:
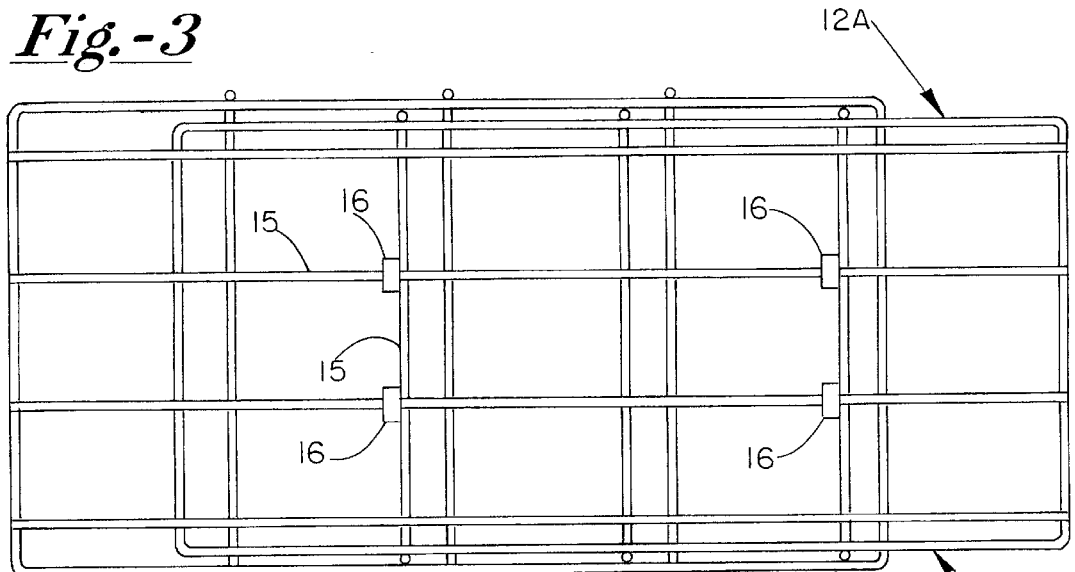
FIG. 3 is an underside view of the support members.
Figure 4:
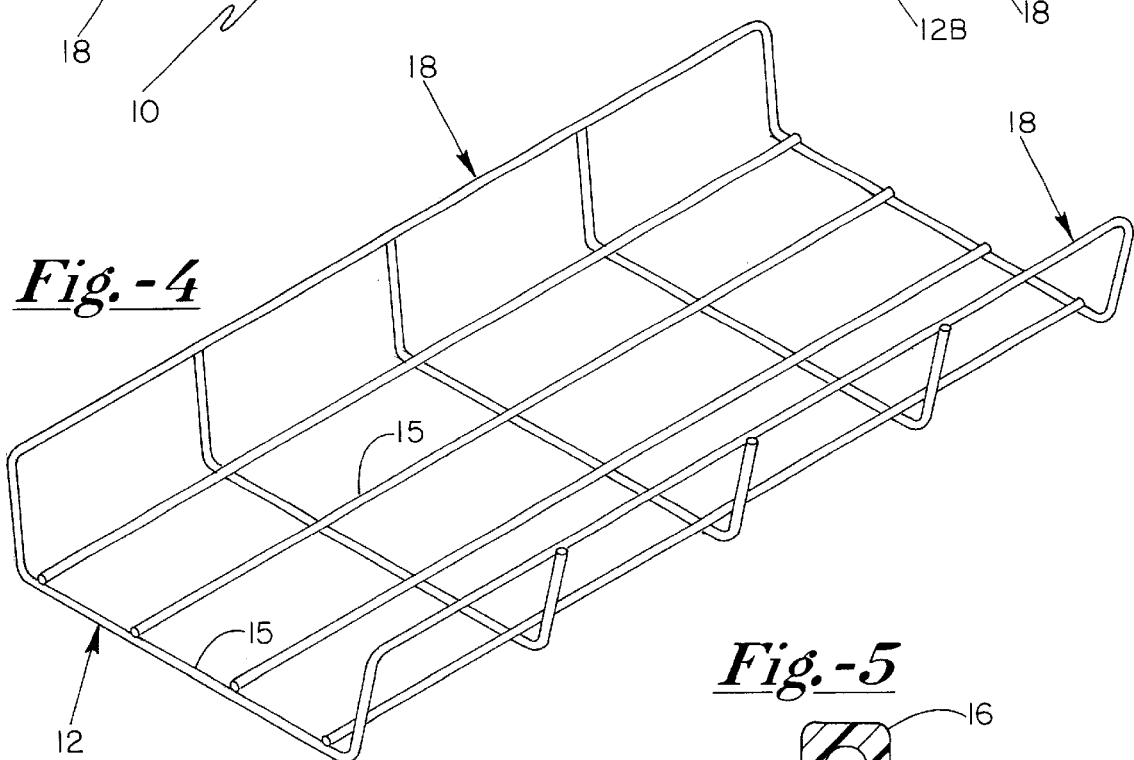
FIG. 4 is a perspective view of a support member.
Figure 5:
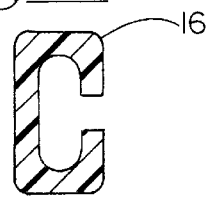
FIG. 5 is a sectioned view of a clip for holding the support members together.

A wire rack or laundry tub caddy 10 rests inside a laundry tub or kitchen sink 11 and has a pair of horizontal stiff wire bottom support bases 12 for holding cleaning supplies or the like and upwardly extending left and right side hanger members 13 which have hooks 14 at their upper ends to engage the top edge 17 of a tub or sink 11 to hold the rack in place.

The bottom supports 12 are virtually identical sections and are constructed in a conventional fashion out of crossed stiff wires 15. Preferably wires 15 are coated with some type of plastic for appearance and for protection against wear or rust. The two sections 12A and 12B rest one over the other with the respective wires 15 in contact with one another. A set of clips 16 generally in a C shape are spaced along the wires 15 to engage and hold together respectively corresponding wires of the two sections 12A and 12B so that they are held together but at the same time allowing them to be slidably moved left or right or sideways with respect to one another, as illustrated in the drawings. In this fashion, then, the bottom supports 12 can be adjusted as required to fit into tubs or sinks of various sizes.

The upward extending hanger members 13 are curled at 19 for pivotal attachment at their lower ends to respective ends of the bottom support members 12. Preferably the lower ends of members 13 are curved upward to engage crosswires 15 at the ends of the horizontal support members 12 to provide the pivotable engagement At their upper ends hanger members 13 have hooks 14 for grasping the top edges 17 of sink or tub 11 to hold the rack in place within the confines of the sink or tub.

The front and back sides of the horizontal support or base member 12 may have upstanding walls 18 made out of stiff wire to keep anything resting on the base members from falling off the front or back edges.

I claim:

1. An adjustable rack for a laundry tub or sink or the like, comprising:
    a pair of generally rectangular rack members each having a horizontal bottom, parallel front and back walls extending generally upward from the front and back edges of the bottom, respectively, and two side ends;
    said bottom and said walls comprising a plurality of spaced-apart parallel stiff wire members;
    one of said rack members slidably telescoped within the other rack member;
    clips for slidably engaging parallel adjacent stiff wire members on the bottom of each of the telescoped rack members; and
    hanger members swingably attached at their lower ends to a side end of each of said rack members, said hanger members hooked at their upper ends for engaging the top edge of a tub wall.

2. An adjustable rack for holding articles in a laundry tub or sink and the like, said rack comprising:
    a pair of generally flat, horizontal, generally rectangular support members, each comprising a plurality of equally spaced-apt elongated stiff wire members;
    one of said support members slidably resting over the other support member;
    clips for slidably holding together adjacent wire members on each of said support members; and
    a pair of hanger members, each having an upper and lower end pivotally attached at a lower end to an end of each of said support members and extending upward therefrom, said hanger members being hooked at the upper end for engaging the top edge of a tub.

3. An adjustable rack for holding articles in a laundry tub or sink and the like, said rack comprising:
    a pair of generally flat, horizontal, generally rectangular support members, each comprising a plurality of equally spaced-apart elongated stiff wire members, said support members having front, back and side edges;

one of said support members slidably resting over the other support member;

clips for slidably holding together adjacent wire members on each of said support members; and a pair of hanger members, each having an upper and lower end, said hanger members pivotally attached at a lower end to a side edge of each of said support members and extending upward therefrom, said hanger members being hooked at their upper ends for engaging the top edge of a tub.

4. An adjustable rack as described in claim 3 further including an upwardly extending stiff wire wall along at least one of the front and back edges of said support members.

5. An adjustable rack as described in claim 3 further including an upwardly extending stiff wire wall along the front edge of one of said support members and along the back edge of the other support member.

\* \* \* \* \*